United States Patent
Hesseler et al.

(10) Patent No.: US 11,685,345 B2
(45) Date of Patent: Jun. 27, 2023

(54) MOTOR VEHICLE WITH HYDRAULICALLY SUPPORTED ELECTRIC PARKING BRAKE AND METHOD FOR OPERATING THE SAME

(71) Applicant: Ford Global Technologies, LLC, Dearborn, MI (US)

(72) Inventors: Karl-Peter Hesseler, Siegburg (DE); Olga Bergen, Cologne (DE); Christian Schmaler, Erftstadt (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 264 days.

(21) Appl. No.: 17/112,472

(22) Filed: Dec. 4, 2020

(65) Prior Publication Data

US 2021/0171000 A1 Jun. 10, 2021

(30) Foreign Application Priority Data

Dec. 10, 2019 (DE) .......................... 102019133639.2

(51) Int. Cl.
  *B60T 7/12* (2006.01)
  *B60T 8/171* (2006.01)
  *B60T 13/66* (2006.01)

(52) U.S. Cl.
  CPC .............. *B60T 7/12* (2013.01); *B60T 8/171* (2013.01); *B60T 13/66* (2013.01);
  (Continued)

(58) Field of Classification Search
  CPC . B60T 7/12; B60T 8/171; B60T 13/66; B60T 2201/10; B60T 2220/04;
  (Continued)

(56) References Cited

U.S. PATENT DOCUMENTS

| 6,406,102 B1 * | 6/2002 | Arnold | B60T 13/74 303/20 |
| 10,723,356 B2 * | 7/2020 | Schartner | B60W 30/18118 |

(Continued)

FOREIGN PATENT DOCUMENTS

| CN | 110053620 A * | 7/2019 | ............... B60T 7/12 |
| DE | 4143666 C2 | 7/2003 | |

(Continued)

OTHER PUBLICATIONS

BMW Technology Guide: Electromechanical Parking Brake.
The Principal of Operation of the Electronic Parking Brake.

*Primary Examiner* — Mary Cheung
(74) *Attorney, Agent, or Firm* — Burr and Forman LLP; Lorne Forsythe

(57) ABSTRACT

A braking system for a motor vehicle includes a hydraulic service brake for braking the motor vehicle in driving operation, an electric parking brake for holding the motor vehicle at a standstill, and an electronic control system for automatically controlling the parking brake and the service brake. The electronic control system may be adapted to activate the parking brake, with the service brake activated, after the motor vehicle has been braked to the standstill via the activated service brake, and to at least partly deactivate the activated service brake after the parking brake has been activated. The electronic control system may also be adapted to deactivate the activated parking brake following operation of an accelerator pedal of the motor vehicle.

16 Claims, 2 Drawing Sheets

Figure 1:
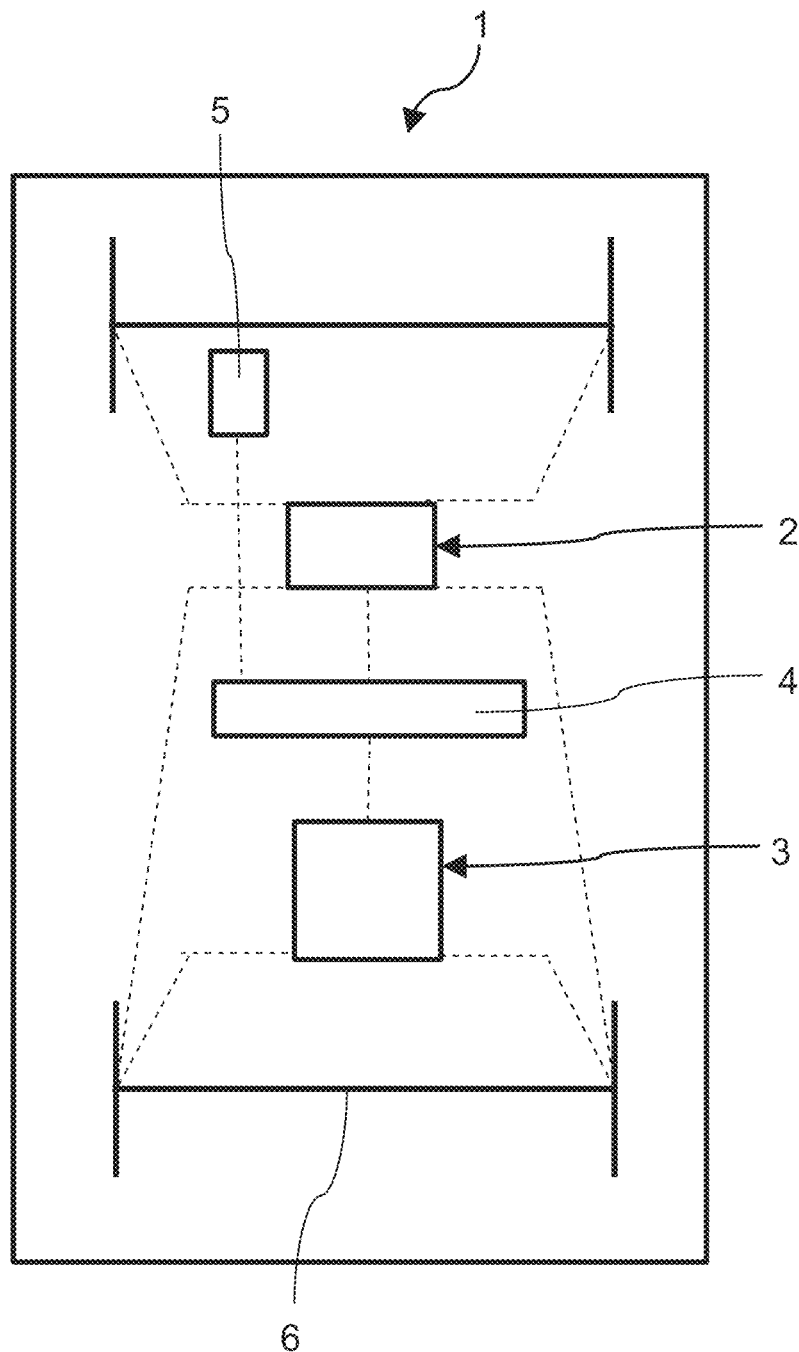

(52) U.S. Cl.
  CPC ....... *B60T 2201/10* (2013.01); *B60T 2220/04* (2013.01); *B60T 2250/04* (2013.01)

(58) Field of Classification Search
  CPC ...... B60T 2250/04; B60T 8/172; B60T 13/74; B60T 13/745
  See application file for complete search history.

(56) References Cited

U.S. PATENT DOCUMENTS

2013/0226425 A1* 8/2013 Oliveira .................. B60T 7/12
                                                          701/70
2018/0126969 A1* 5/2018 Blattert ................. B60T 8/447
2020/0001810 A1* 1/2020 Baehrle-Miller ..... F16D 55/226

FOREIGN PATENT DOCUMENTS

| DE | 102005026076 A1 | * | 12/2006 | ................ B60T 7/22 |
| DE | 102016201664 A1 | * | 8/2017 | ................ B60T 7/08 |
| DE | 102019200955 A1 | * | 7/2020 | ............. B60T 1/065 |
| EP | 2719587 A1 | | 4/2014 | |
| JP | 2006306206 A | * | 11/2006 | |
| WO | 02017202526 A1 | | 11/2017 | |

* cited by examiner

MOTOR VEHICLE WITH HYDRAULICALLY SUPPORTED ELECTRIC PARKING BRAKE AND METHOD FOR OPERATING THE SAME

TECHNICAL FIELD

Example embodiments generally relate to motor vehicles having at least one hydraulic service brake for braking the motor vehicle in driving operation, at least one electric parking brake for holding the motor vehicle at a standstill, and at least one electronic control system for automatically controlling the parking brake and the service brake.

BACKGROUND

Motor vehicles can be equipped with a hydraulic service brake by means of which the motor vehicle can be braked in driving operation. A service brake can additionally also be used to perform standstill functions of the motor vehicle, for example to perform an auto-hold function, a hill-hold function, a standstill-hold function of an adaptive cruise control or the like, in order to temporarily hold the vehicle at a standstill. The motor vehicle can additionally have an electric parking brake with which the motor vehicle can permanently be secured at a standstill. In particular, passenger cars have in recent years been correspondingly equipped.

It is additionally known to activate the electric parking brake of a motor vehicle when a driver exits the motor vehicle, so that the motor vehicle is mechanically secured at a standstill without electrical energy being consumed. The electric parking brake is thereby activated when the driver exits in order to ensure that the electric parking brake does not have any faults, wherein the electric parking brake is activated completely before the driver has exited the motor vehicle. In order to detect that the driver is exiting, a door state of a driver's door of the motor vehicle is frequently monitored.

There is a trend towards equipping commercial vehicles with more convenience functions and standstill functions. However, delivery trucks, for example, are equipped with doors which do not always allow a reliable conclusion to be drawn about the door state, or are not equipped with a door. In addition, some delivery trucks have a stowage space access so that the driver can leave the driver's seat and enter the stowage space at the rear without the driver's door being opened.

Seat-belt buckle information relating to a seat-belt buckle associated with the driver's seat can likewise be used for detecting the driver's exit from the motor vehicle, but there may be situations in which the driver unfastens his seat belt without intending to exit the motor vehicle. Seat-belt buckle information is therefore not preferred for detecting the driver's exit.

DE 41 43 666 C2 discloses a parking brake system for motor vehicles which is operated by an electric motor. The brake system has an electronic control device which is electrically connected to the brake operating device and the electric motor(s) and to sensors and which controls the application and release of the wheel brakes in dependence on signals from the brake operating device and/or the sensors. By means of the electronic control device, a brake application force can be brought about automatically when the motor vehicle is braked to a standstill and the service brake pedal is held in the braking position for a predetermined time period after a standstill has been reached. By means of the electronic control device, the parking brakes can be released automatically when the service brake is applied again.

WO 2017/202526 A1 discloses a method for monitoring the braking force in a vehicle, the braking system of which has a hydraulic vehicle brake and at least one electromechanical braking device with an electric brake motor for generating braking force. The hydraulic brake pressure of the hydraulic vehicle brake and the electric brake motor act at the same time on the same brake piston of a wheel braking device, wherein a fault signal representing too low a hydraulic brake pressure in the hydraulic vehicle brake is generated if the gradient of the electromechanical braking force increase or of a corresponding parameter lies outside a permissible range of values.

U.S. Pat. No. 5,431,607 discloses a drive and braking arrangement for a motor vehicle, having at least one electric motor which drives the motor vehicle in dependence on the setting of an accelerator pedal, a forward/reverse drive direction selector which adjusts the driving direction of rotation of the electric motor or electric motors, means for detecting the driving speed of the motor vehicle, and a friction brake arrangement acting on at least one wheel of the motor vehicle. The friction brake arrangement has an actuating drive controlling the braking force. An electronic control unit sets the actuating drive into a braking position when the accelerator pedal remains in a drive position for longer than a predetermined period of time and at the same time the detected driving speed is zero, and/or when means associated with the control unit detect an actual movement direction of the motor vehicle which is opposite to the driving direction selected at the selector.

U.S. Patent Application Publication No. 2018/0056951 discloses a method for operating an automated parking brake for a motor vehicle having at least one braking device. The parking brake can adopt at least two states, wherein in a first state no clamping force is built up by means of the parking brake and in a second state a clamping force is built up by means of the parking brake. A transition point defines the transition between the two states. An identification of the transition point takes place during an operation of releasing the parking brake.

U.S. Pat. No. 9,643,583 discloses a method for providing the clamping force generated by a parking brake in a vehicle, which clamping force is generated at least in part by an electromechanical braking device having an electric brake motor which applies a brake piston against a brake disk. The clamping force is determined as a function of the motor constants of the brake motor, and the motor constant is ascertained from instantaneous measured values of the motor current, which are measured during an activation of the brake motor. In order to determine the motor constants, the no-load voltage and the no-load current are measured during a no-load phase of the brake motor. The motor current is ascertained during a dynamic current change phase.

U.S. Pat. No. 8,935,071 discloses a method for the fail-safe functioning of a lane centering system, wherein a computer processor is used, an electric power assisted steering system of a vehicle is monitored for failure, and the operation of the lane centering system is switched to a differential braking controller in order to output differential braking commands to a differential braking system when it is determined that a failure of the electric power assisted steering system has occurred. The outputted braking commands instruct the differential braking system to apply a force to a brake for a wheel of the vehicle so that, as a result of the applied braking force, the vehicle follows a desired path intended for a lane centering operation.

EP 2719587 A1 discloses a method for operating an electrically operable parking brake system of a vehicle. On detection of a trigger event, transfer of the electrically operable parking brake system from a released operating state into an applied operating state is initiated, and a predetermined waiting time period is started, independently of an operating device which is used for manually operating the electrically operable parking brake system and/or for releasing the parking brake system in the case of a defect of an operating device.

The publication "Here's How the Electronic Parking Brake", which is available using the link https://automa-nana.com/heres-how-the-electronic-parking-brake, and the publication "Electromechanical Parking Brake", which is available using the link http://www.bmw.com.kh/asia/en/insights/technology/technology_guide/artiles/electromechanicnal_parking_brake.html?source=index&article=electromechanical_parking brake, each disclose an electronic parking brake system for a motor vehicle.

BRIEF SUMMARY OF SOME EXAMPLES

Some example embodiments may provide a braking system for a motor vehicle. The braking system may include a hydraulic service brake for braking the motor vehicle in driving operation, an electric parking brake for holding the motor vehicle at a standstill, and an electronic control system for automatically controlling the parking brake and the service brake. The electronic control system may be adapted to activate the parking brake, with the service brake activated, after the motor vehicle has been braked to the standstill via the activated service brake, and to at least partly deactivate the activated service brake after the parking brake has been activated. The electronic control system may also be adapted to deactivate the activated parking brake following operation of an accelerator pedal of the motor vehicle.

In accordance with an example embodiment, a method for operating a braking system of a motor vehicle having at least one hydraulic service brake for braking the motor vehicle in driving operation, at least one electric parking brake for holding the motor vehicle at a standstill, and at least one electronic control system for automatically controlling the parking brake and the service brake may be provided. The method may include detecting that the motor vehicle has been braked to a standstill responsive to activating the service brake, activating the parking brake, with the service brake activated, responsive to detecting the standstill, at least partly deactivating the activated service brake in response to the activating the parking brake, and deactivating the parking brake responsive to sensing operation of an accelerator pedal of the motor vehicle.

BRIEF DESCRIPTION OF THE SEVERAL VIEWS OF THE DRAWING(S)

Figure 2:
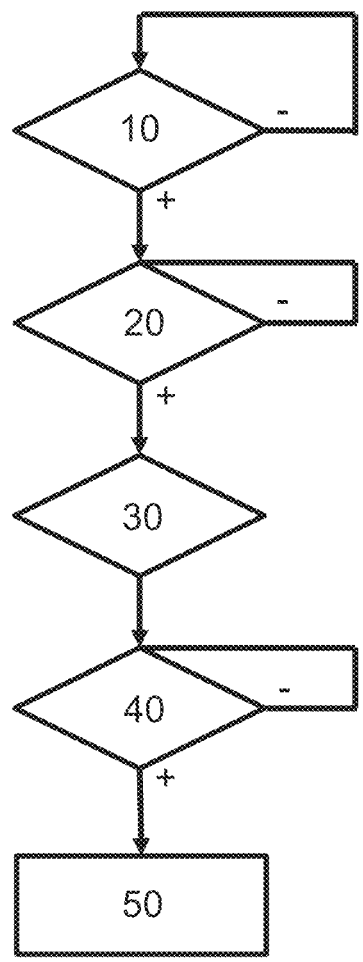

Having thus described the invention in general terms, reference will now be made to the accompanying drawings, which are not necessarily drawn to scale, and wherein:

FIG. 1 is a schematic representation of a motor vehicle according of an example embodiment; and FIG. 2 is a flow diagram of a method according to of an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

An example embodiment may provide an electronic control system that is adapted to activate the parking brake, with the service brake activated, after the motor vehicle has been braked to a standstill by means of the activated service brake, and to at least partly deactivate the activated service brake after the parking brake has been activated. Example embodiments may relate additionally to a method for operating a motor vehicle which has at least one hydraulic service brake for braking the motor vehicle in driving operation, at least one electric parking brake for holding the motor vehicle at a standstill, and at least one electronic control system for automatically controlling the parking brake and the service brake, wherein the parking brake is activated, with the service brake activated, after the motor vehicle has been braked to a standstill by means of the activated service brake, and the activated service brake is at least partly deactivated after the parking brake has been activated. Example embodiments may, for example, achieve a standstill-hold mode of a motor vehicle more cost-effectively and more efficiently than those methods described above.

In this regard, some example embodiments may provide motor vehicle having a hydraulic service brake and an electronic parking brake along with a electronic control system that is adapted to deactivate the activated parking brake following operation of an accelerator pedal of the motor vehicle.

In some example embodiments, activation of the electric parking brake when the motor vehicle is at a standstill may be assisted by the hydraulic service brake. To that end, a brake piston, on which both the parking brake and the service brake can act, is held in a braking position by means of the service brake prior to activation of the parking brake. As a result, during the activation of the parking brake, or a transfer of the parking brake from a released state, in which the brake piston is not subjected to a braking force by the parking brake, into a braking state, in which the brake piston is subjected to a braking force by the parking brake, lower forces act on components of the parking brake, such as, for example, an electric motor, a spindle or the like. As a result, mechanical wear of these components is reduced. In addition, by assisting the parking brake in this manner, a length of time until the braking state of the parking brake is reached can be shortened.

When a driver of the motor vehicle according to an example embodiment wishes to stop the motor vehicle, he/she operates the hydraulic service brake, which operates a wheel brake at each vehicle wheel, via a brake pedal of the motor vehicle. Once the motor vehicle has come to a standstill, the driver can release the brake pedal, and the brake pressure required by the driver is usually maintained in the service brake. That is to say the service brake remains activated. The electronic control system, which is able to detect that the vehicle is at a standstill, for example, by means of a sensor via a sensor system that is present, can then activate the parking brake with the service brake activated. In this regard, the brake piston of the respective wheel brake is adjusted until a brake pad operated by the brake piston comes into contact with a brake disk or other active surface (brake drum) of the respective wheel brake and is pressed with force against the brake disk or other active surface (drum brake). Since the required braking torque is thereby already applied by the service brake, an electric brake motor of the parking brake can be moved without having to generate a substantial braking torque to hold the same brake piston in contact with the brake pad or brake disc, which reduces the wear of the parking brake. Once the parking brake has reached the braking state, the brake pressure within the service brake can be reduced at least partly, in order to at least partly deactivate the service brake while still keeping force against the brake disk or brake drum via the parking brake. The motor vehicle is then secured at a standstill either partly by means of the parking brake and partly by means of the service brake or wholly by means of the parking brake. Responsive to the electronic control system in this state detecting, for example by means of a sensor, an operation of the accelerator pedal of the motor vehicle, the electronic control system may deactivate the activated parking brake in order to release the securing of the motor vehicle at a standstill. If the motor vehicle is secured at a standstill partly by means of the service brake, the service brake may also be deactivated by means of the electronic control system at the same time or with a time lag of a predefined amount of time.

In various example embodiments, the service brake may be a disk brake, drum brake, or other service brake (e.g., a hydraulic service brake). The hydraulic service brake can be of conventional form and is adapted to brake the motor vehicle in driving operation, which does not rule out the possibility of the service brake also being activated while the motor vehicle is at a standstill. The electric parking brake can be of conventional form and is adapted to hold the motor vehicle at a standstill, but it can additionally also have further conventional functions of an electric parking brake during a driving operation of the motor vehicle. The electronic control system, in addition to automatically controlling the parking brake and the service brake, can also have other functions. The electronic control system can be formed by a software implementation in an existing vehicle electronics system or as a separate component. Thus, for example a processor or processing circuitry (e.g., including a processor and memory storing instructions that when executed perform the corresponding described functions) may be used to implement the functionality of the electronic control system.

In order to secure the motor vehicle at a standstill according to an example embodiment, it is not necessary to monitor a door state of a driver's door of the motor vehicle in order to be able to detect the exit of a driver. Since it is not necessary for the operation of the motor vehicle to detect the exit of the driver when the motor vehicle is at a standstill, example embodiments may save costs compared to solutions in which a more complex driver exit detection is used if a door state signal is not available.

In an example embodiment, the motor vehicle can be, for example, a passenger car or a commercial vehicle, in particular a delivery truck.

In an example embodiment, the electronic control system may be adapted to activate the service brake, which is at least partly deactivated when the vehicle is at a standstill, following operation of the accelerator pedal before the activated parking brake is deactivated, and to begin the deactivation of the service brake after the deactivation of the parking brake has begun. The mechanical braking load is thereby removed from the parking brake before the parking brake is deactivated. In addition, the deactivation of the parking brake can be carried out more quickly than in the case of a parking brake which is under a mechanical load. In some examples, the operation of the service brake may be coordinated with the operation of the parking brake in such a manner that a brake spindle of the parking brake can be moved away load-free from the brake disk for deactivation of the parking brake, which significantly reduces the wear of the parking brake. The deactivation of the service brake can be begun while the parking brake is being deactivated or after the parking brake has been deactivated. The electronic control system can be adapted to detect the operation of the accelerator pedal by means of a sensor. The activation of the service brake following operation of the accelerator pedal can take place in such a manner that the service brake generates a brake pressure which is sufficient to secure the motor vehicle at a standstill by means of the service brake on its own.

In an example embodiment, the electronic control system may be adapted to activate the service brake, when the vehicle reaches a standstill, in such a manner that a braking force present at a rear axle of the motor vehicle is sufficient on its own to hold the motor vehicle at a standstill. The parking brake may serve solely to operate wheel brakes on a rear axle of the motor vehicle. However, when the motor vehicle has been braked to a standstill by means of the service brake, the wheel brakes on the rear axle and the wheel brakes on a front axle of the motor vehicle together generate a braking force which is sufficient to hold the motor vehicle at a standstill, in particular also on a sloping surface. In order to ensure that the braking force of the wheel brakes on the rear axle is sufficient on its own to hold the motor vehicle at a standstill, a brake pressure may be generated by means of the service brake that generates a corresponding braking force at the rear axle of the motor vehicle. This braking force may then be applied and maintained by the parking brake after the parking brake has been activated.

In an example embodiment, the electronic control system may be adapted to activate the parking brake, when the vehicle is at a standstill, only if a required braking force of the service brake on braking of the motor vehicle to a standstill exceeds a predefined minimum value. This can be helpful if a pronounced brake pressure build-up corresponding to the last-mentioned embodiment when the vehicle is at a standstill is not desired, for example because of the associated noise. The predefined minimum value is so chosen that a brake force that exceeds the minimum value is sufficient to hold the motor vehicle securely at a standstill solely by means of the component of the brake force that is generated by the wheel brakes on the rear axle of the motor vehicle. Alternatively, the parking brake can be activated by means of the electronic control system each time the motor vehicle is at a standstill.

In an example embodiment, the activated parking brake may be deactivated following operation of an accelerator pedal of the motor vehicle.

In an example embodiment, the service brake, which is at least partly deactivated when the vehicle is at a standstill, may be activated following operation of the accelerator pedal before the activated parking brake is deactivated. The deactivation of the service brake may be begun after the deactivation of the parking brake has begun. The features mentioned above in relation to the corresponding embodiment of the motor vehicle are correspondingly associated with this example embodiment.

In an example embodiment, the service brake may be activated, when the vehicle reaches a standstill, in such a manner that a braking force present at a rear axle of the motor vehicle is sufficient on its own to hold the motor vehicle at a standstill. The features mentioned above in relation to the corresponding embodiment of the motor vehicle are correspondingly associated with this example embodiment.

In an example embodiment, the parking brake may be activated, when the vehicle is at a standstill, only if a required braking force of the service brake on braking of the motor vehicle to a standstill exceeds a predefined minimum value. The features mentioned above in relation to the corresponding embodiment of the motor vehicle are correspondingly associated with this example embodiment.

FIG. 1 shows a schematic representation of a motor vehicle 1 according to an example embodiment. The motor vehicle 1 has a hydraulic service brake 2 for braking the motor vehicle 1 in driving operation. The motor vehicle 1 additionally has an electric parking brake 3 for holding the motor vehicle 1 at a standstill. Moreover, the motor vehicle 1 has an electronic control system 4 for automatically controlling the parking brake 3 and the service brake 2.

The electronic control system 4 is adapted to activate the parking brake 3, with the service brake 2 activated, after the motor vehicle 1 has been braked to a standstill by means of the activated service brake 2, and to at least partly deactivate the activated service brake 2 after the parking brake 3 has been activated. In some cases, the standstill condition may be detected based on lack of movement of the vehicle for at least a predetermined period of time. In addition, the electronic control system 4 is adapted to deactivate the activated parking brake 3 following operation of an accelerator pedal 5 of the motor vehicle 1. In other words, operating the accelerator pedal 5 may transition the motor vehicle 1 out of the standstill condition by deactivating the parking brake 3, which was previously activated responsive to detecting the standstill condition.

The electronic control system 4 may be further adapted to activate the service brake 2, which is at least partly deactivated when the vehicle is at a standstill, following operation of the accelerator pedal 5 before the activated parking brake 3 is deactivated, and to begin the deactivation of the service brake 2 after the deactivation of the parking brake 3 has begun. Thus, a sequence is created to transition from the parking brake 3 to the service brake 2 during exiting from the standstill condition.

The electronic control system 4 may additionally be adapted to activate the service brake 2, when the vehicle reaches a standstill, in such a manner that a braking force present at a rear axle 6 of the motor vehicle 1 is sufficient on its own to hold the motor vehicle 1 at a standstill. In other words, in some cases the braking forces may only be applied at wheels of the rear axle 6 instead of all wheels of the motor vehicle 1.

The electronic control system 4 may further be adapted to activate the parking brake 3, when the vehicle is at a standstill, only if a required braking force of the service brake 2 on braking of the motor vehicle 1 to a standstill exceeds a predefined minimum value. The electronic control system 4 may include processing circuitry that is configurable by execution (e.g., via a processor) of instructions stored in a storage medium (e.g., memory) to perform the activation and deactivation operations described herein in the corresponding sequence also described herein.

FIG. 2 shows a flow diagram of an exemplary embodiment of a method according to the invention for operating a motor vehicle, not shown, which has a hydraulic service brake for braking the motor vehicle in driving operation, an electric parking brake for holding the motor vehicle at a standstill, and an electronic control system for automatically controlling the parking brake.

In method step 10, the electronic control system checks whether the motor vehicle has been braked to a standstill by means of the activated service brake. If the motor vehicle has not been braked to a standstill by means of the activated service brake, the electronic control system repeats method step 10 as part of a monitoring operation.

If the motor vehicle has been braked to a standstill by means of the activated service brake, the electronic control system checks in method step 20 whether the service brake has been activated, when the vehicle reached a standstill, in such a manner that a braking force present at a rear axle of the motor vehicle is sufficient on its own to hold the motor vehicle at a standstill. If the braking force present at the rear axle of the motor vehicle is not sufficient on its own to hold the motor vehicle at a standstill, the electronic control system repeats method step 20 as part of a monitoring operation.

If the braking force present at the rear axle of the motor vehicle is sufficient on its own to hold the motor vehicle at a standstill, the parking brake is activated by means of the electronic control system in method step 30, with the service brake activated, and the activated service brake is at least partly deactivated after the parking brake has been activated. In method step 30, it can additionally be checked by means of the electronic control system whether a required braking force of the service brake on braking of the motor vehicle to a standstill exceeded a predefined minimum value. If the required braking force of the service brake on braking of the motor vehicle to a standstill did not exceed the predefined minimum value, the electronic control system does not continue with the activation of the parking brake. If the required braking force of the service brake on braking of the motor vehicle to a standstill exceeded the predefined minimum value, the electronic control system can activate the parking brake.

In method step 40, the electronic control system checks whether an accelerator pedal of the motor vehicle is being operated. If the accelerator pedal is not being operated, the electronic control system repeats method step 40 as part of a monitoring operation.

If the accelerator pedal of the motor vehicle is being operated, the electronic control system deactivates the activated parking brake in method step 50. In method step 50, the service brake, which is at least partly deactivated when the vehicle is at a standstill, can additionally be activated by means of the electronic control system following operation of the accelerator pedal, before the activated parking brake is deactivated, wherein the deactivation of the service brake can be begun after the deactivation of the parking brake by means of the electronic control system has begun.

Accordingly, a braking system for a motor vehicle may be provided. The braking system may include a hydraulic service brake for braking the motor vehicle in driving operation, an electric parking brake for holding the motor vehicle at a standstill, and an electronic control system for automatically controlling the parking brake and the service brake. The electronic control system may be adapted to activate the parking brake, with the service brake activated, after the motor vehicle has been braked to the standstill via the activated service brake, and to at least partly deactivate the activated service brake after the parking brake has been activated. The electronic control system may also be adapted to deactivate the activated parking brake following operation of an accelerator pedal of the motor vehicle.

The brake control system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the electronic control system may be adapted or configured to activate the service brake, which is at least partly deactivated when the vehicle is at the standstill, following operation of the accelerator pedal before the activated parking brake is deactivated, and to begin the deactivation of the service brake after the deactivation of the parking brake has begun. In some example embodiments, the electronic control system may be adapted or configured to activate the service brake, when the vehicle reaches the standstill, in such a manner that a braking force present at a rear axle of the motor vehicle is sufficient on its own to hold the motor vehicle at a standstill. In some cases, the electronic control system may be adapted or configured to activate the parking brake, when the vehicle is at the standstill, only if a required braking force of the service brake on braking of the motor vehicle to the standstill exceeds a predefined minimum value. In an example embodiment, the motor vehicle may be brought to the standstill by application of the service brake responsive to operation of a brake pedal of the motor vehicle. The electronic control system may maintain brake pressure of the service brake responsive to detecting the standstill even after the brake pedal is released from operation. In some cases, the motor vehicle may be brought to the standstill by application of the service brake responsive to operation of a brake pedal of the motor vehicle, and application of the service brake may cause a brake piston to adjust a brake pad to contact a brake disk or drum. The electronic control system, responsive to detection of the standstill, may activate the parking brake to cause an electric brake motor of the parking brake to hold the brake piston such that the brake pad stays in contact with the brake disk or drum. In an example embodiment, the service brake may be deactivated fully responsive to the parking brake being activated. In some cases, the service brake may be deactivated responsive to elapsing of a predetermined time lag after the parking brake is activated. In some cases, the service brake may be activated to enable deactivation of the parking brake responsive to operation of the accelerator pedal of the motor vehicle. In an example embodiment, the service brake may be deactivated responsive to the parking brake being activated, and the service brake may be activated to enable deactivation of the parking brake responsive to operation of the accelerator pedal of the motor vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A braking system for a motor vehicle, the braking system comprising:
    a hydraulic service brake for braking the motor vehicle in driving operation;
    an electric parking brake for holding the motor vehicle at a standstill; and
    an electronic control system for automatically controlling the parking brake and the service brake,
    wherein the electronic control system is adapted to activate the parking brake, with the service brake activated, after the motor vehicle has been braked to the standstill via the activated service brake, and to at least partly deactivate the activated service brake after the parking brake has been activated, and
    wherein the electronic control system is adapted to deactivate the activated parking brake following operation of an accelerator pedal of the motor vehicle;
    wherein the electronic control system is adapted to activate the service brake, which is at least partly deactivated when the vehicle is at the standstill, following operation of the accelerator pedal before the activated parking brake is deactivated, and to begin the deactivation of the service brake after the deactivation of the parking brake has begun.

2. The braking system of claim 1, wherein the electronic control system is adapted to activate the service brake, when the vehicle reaches the standstill, in such a manner that a braking force present at a rear axle of the motor vehicle is sufficient on its own to hold the motor vehicle at a standstill.

3. The braking system of claim 1, wherein the electronic control system is adapted to activate the parking brake, when the vehicle is at the standstill, only if a required braking force of the service brake on braking of the motor vehicle to the standstill exceeds a predefined minimum value.

4. The braking system of claim 1, wherein the motor vehicle is brought to the standstill by application of the service brake responsive to operation of a brake pedal of the motor vehicle, and wherein the electronic control system maintains brake pressure of the service brake responsive to detecting the standstill even after the brake pedal is released from operation.

5. The braking system of claim 1, wherein the motor vehicle is brought to the standstill by application of the service brake responsive to operation of a brake pedal of the motor vehicle,
wherein application of the service brake causes a brake piston to adjust a brake pad to contact a brake disk or drum, and
wherein the electronic control system, responsive to detection of the standstill, activates the parking brake to cause an electric brake motor of the parking brake to hold the brake piston such that the brake pad stays in contact with the brake disk or drum.

6. The braking system of claim 5, wherein the service brake is deactivated fully responsive to the parking brake being activated.

7. The braking system of claim 6, wherein the service brake is deactivated responsive to elapsing of a predetermined time lag after the parking brake is activated.

8. The braking system of claim 5, wherein the service brake is deactivated responsive to the parking brake being activated.

9. A method for operating a braking system of a motor vehicle having at least one hydraulic service brake for braking the motor vehicle in driving operation, at least one electric parking brake for holding the motor vehicle at a standstill, and at least one electronic control system for automatically controlling the parking brake and the service brake, the method comprising:
detecting that the motor vehicle has been braked to a standstill responsive to activating the service brake;
activating the parking brake, with the service brake activated, responsive to detecting the standstill;
at least partly deactivating the activated service brake in response to the activating the parking brake; and
deactivating the parking brake responsive to sensing operation of an accelerator pedal of the motor vehicle;
wherein the service brake, which is at least partly deactivated when the vehicle is at the standstill, is activated following operation of the accelerator pedal before the activated parking brake is deactivated, and the deactivation of the service brake is begun after the deactivation of the parking brake has begun.

10. The method of claim 9, wherein the service brake is activated, when the vehicle comes to the standstill, in such a manner that a braking force present at a rear axle of the motor vehicle is sufficient on its own to hold the motor vehicle at the standstill.

11. The method of claim 9, wherein the parking brake is activated when the vehicle is at a standstill only if a required braking force of the service brake on braking of the motor vehicle to a standstill exceeds a predefined minimum value.

12. The method of claim 9, wherein the motor vehicle is brought to the standstill by application of the service brake responsive to operation of a brake pedal of the motor vehicle, and
wherein the method further comprises maintaining brake pressure of the service brake responsive to detecting the standstill even after the brake pedal is released from operation.

13. The method of claim 9, wherein the motor vehicle is brought to the standstill by application of the service brake responsive to operation of a brake pedal of the motor vehicle,
wherein application of the service brake causes a brake piston to adjust a brake pad to contact a brake disk or drum, and
wherein, responsive to detection of the standstill, the activating the parking brake comprises causing an electric brake motor of the parking brake to hold the brake piston such that the brake pad stays in contact with the brake disk or drum.

14. The method of claim 13, wherein the service brake is deactivated fully responsive to the parking brake being activated.

15. The method of claim 14, wherein the service brake is deactivated responsive to elapsing of a predetermined time lag after the parking brake is activated.

16. The method of claim 13, wherein the service brake is deactivated responsive to the parking brake being activated.

* * * * *